(12) United States Patent
Bassett

(10) Patent No.: US 6,484,860 B1
(45) Date of Patent: Nov. 26, 2002

(54) FRICTION TORQUE DEVICE WITH IMPROVED DAMPER

(75) Inventor: Michael L. Bassett, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 15 days.

(21) Appl. No.: 09/677,655

(22) Filed: Oct. 4, 2000

(51) Int. Cl.$^7$ .............................. F16D 3/14; F16D 3/66
(52) U.S. Cl. ................. 192/70.17; 192/213.3; 192/214
(58) Field of Search ................ 192/70.17, 30 V, 192/213.3, 213.31, 214, 214.1; 464/68

(56) References Cited

U.S. PATENT DOCUMENTS

| | | | |
|---|---|---|---|
| 2,291,405 A | * | 7/1942 | Nutt .......................... 192/214 |
| 3,068,979 A | * | 12/1962 | Arkus-Duntov .......... 192/70.17 |
| 3,266,271 A | | 8/1966 | Stromberg |
| 3,817,362 A | * | 6/1974 | Rist ....................... 192/213.22 |
| 4,093,054 A | | 6/1978 | Johns |
| 4,496,036 A | * | 1/1985 | Loizeau ................. 192/213.31 |
| 4,533,338 A | | 8/1985 | Hamada |
| 4,557,702 A | | 12/1985 | Takeuchi |
| 4,585,110 A | * | 4/1986 | Gobel et al. ............. 192/214.1 |
| 4,606,450 A | * | 8/1986 | Ball et al. ................. 192/214.1 |
| 4,634,398 A | * | 1/1987 | Alas ....................... 192/213.22 |
| 4,638,684 A | | 1/1987 | Maucher |
| 4,700,821 A | | 10/1987 | Maucher et al. |
| 4,789,375 A | | 12/1988 | Bassett |
| 5,007,517 A | | 4/1991 | Flotow |
| 5,120,276 A | | 6/1992 | Maucher et al. |
| 5,123,877 A | | 6/1992 | Maucher et al. |
| 5,246,398 A | | 9/1993 | Birk et al. |
| 5,269,725 A | | 12/1993 | Maucher et al. |
| 5,518,099 A | | 5/1996 | Murphy |
| 5,580,312 A | | 12/1996 | Takeuchi et al. |
| 5,609,526 A | | 3/1997 | Kitayama et al. |
| 5,707,292 A | | 1/1998 | Koda et al. |
| 5,797,474 A | | 8/1998 | Nakane et al. |
| 5,813,915 A | | 9/1998 | Imanaka |
| 5,839,962 A | | 11/1998 | Rohs et al. |
| 5,860,863 A | | 1/1999 | Friedmann et al. |
| 5,871,401 A | | 2/1999 | Maucher et al. |

* cited by examiner

Primary Examiner—Richard M. Lorence
(74) Attorney, Agent, or Firm—Kevin M. Hinman

(57) ABSTRACT

Disclosed herein is a friction torque device with an improved damper for attenuating torsional vibrations. The improved damper provides the desired axial load for damping while reducing the weight, cost, complexity and size of a driven disk for a friction torque device. A friction torque device comprises a driving member having of rotation, a cover coupled to the driving member for rotation therewith, a pressure plate coupled to the cover for rotation therewith and a driven disk coupled to an axially extending driven shaft for rotation therewith. The driven disk is interposed between the driving member and the pressure plate, the driven disk includes a rotatable disk assembly and a hub assembly. The driven disk comprises at least one reinforcing plate having a plurality of undulations disposed therein for providing a load between the disk assembly and hub assembly. The reinforcing plate may be coupled to the disk assembly, the hub assembly or the plate may not be attached to another component. Damping is achieved by the disk assembly rotating relative to the hub assembly whereby torque is dissipated in the form of heat energy.

3 Claims, 3 Drawing Sheets

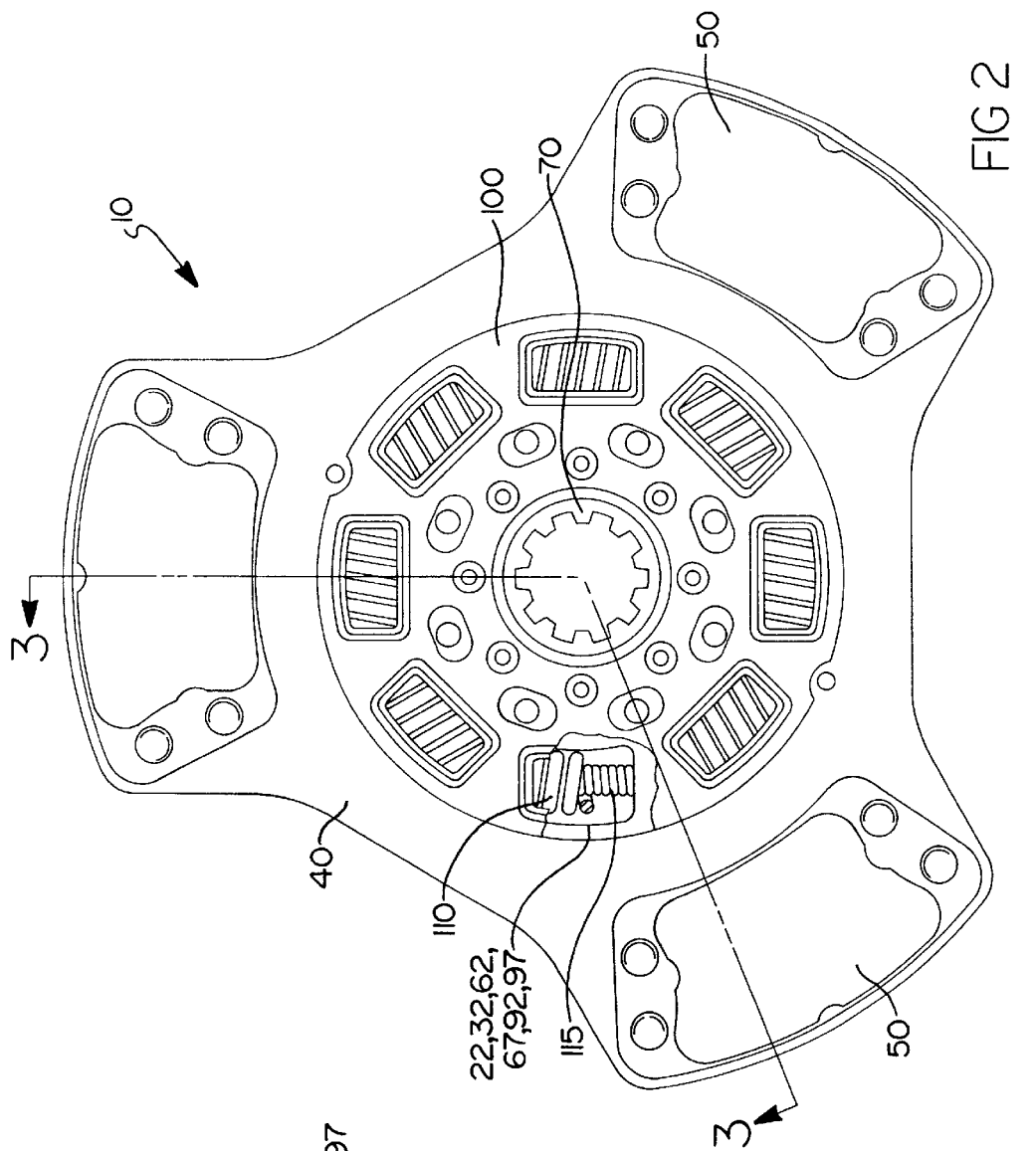
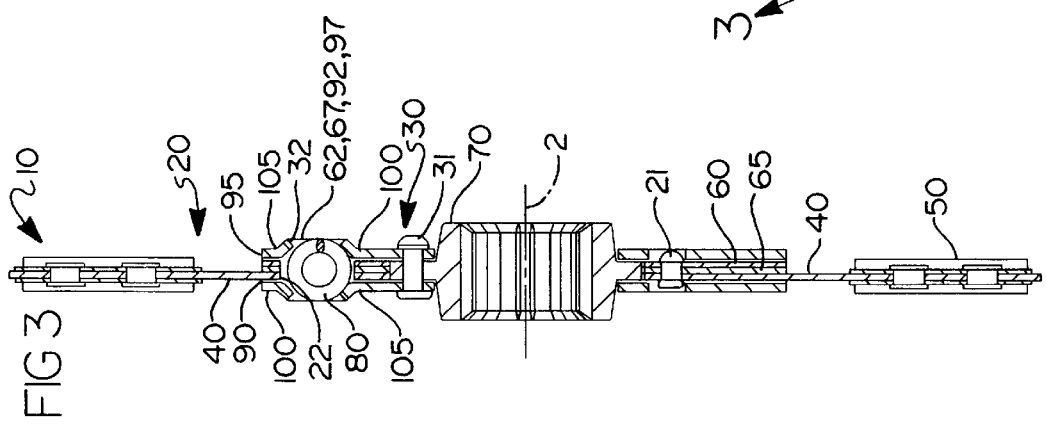

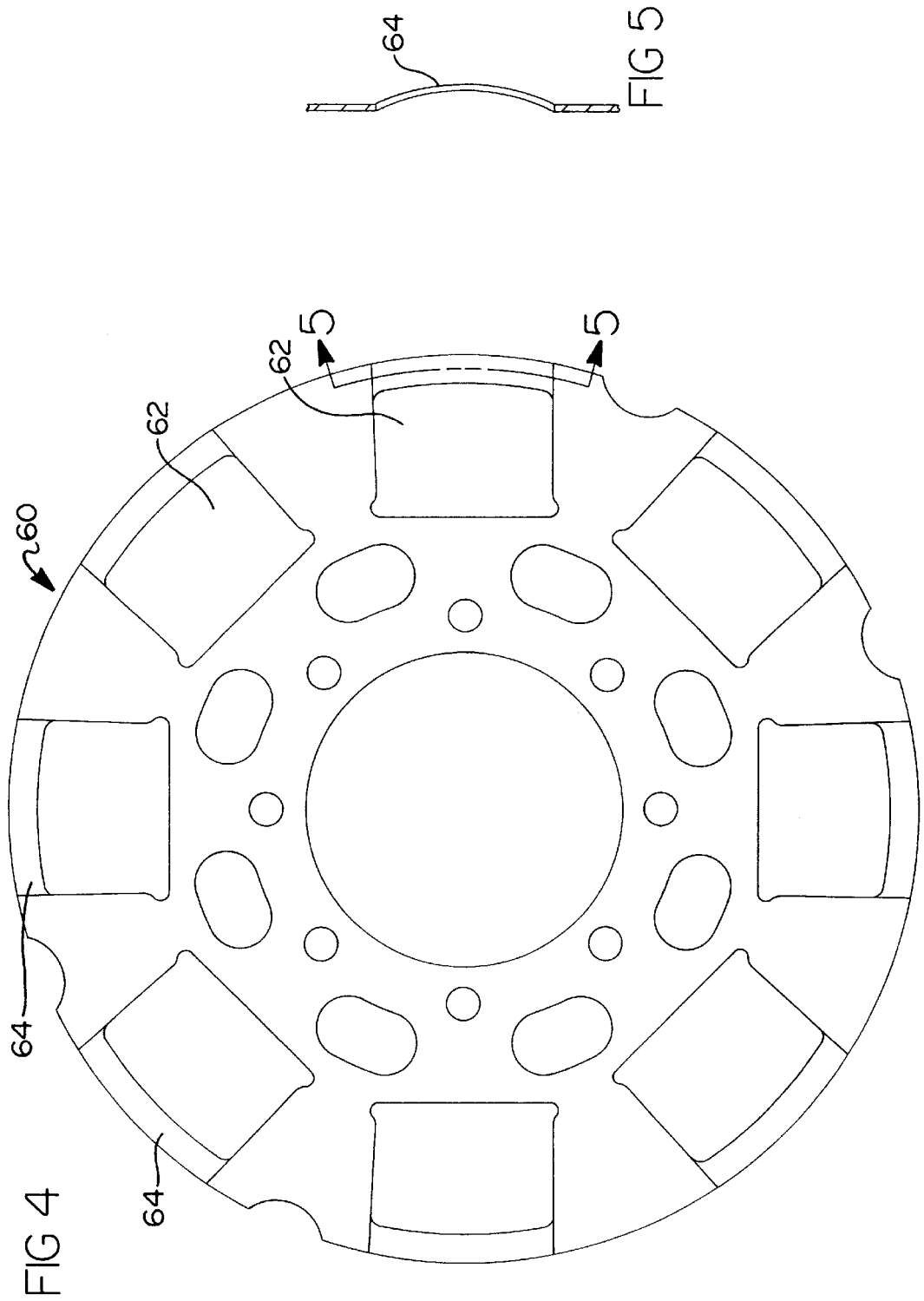

FRICTION TORQUE DEVICE WITH IMPROVED DAMPER

FIELD OF THE INVENTION

The present invention relates to the field of friction clutches, and more specifically, to friction clutches having torsional vibration dampers.

BACKGROUND OF THE INVENTION

Torsional vibrations are the rotational irregularities of a rotatingly driven component. In a vehicle drivetrain, torsional vibrations are caused by the forces generated within a combustion engine by the combustion of gases during the periodic combustion process. Torsional vibrations of the second or third order which originate from the engine, as a result of the ignition frequency of four or six cylinder engines, respectively, are predominant in the vehicle driveline. Torsional vibrations not only emanate from the engine power pulses but also from torque spikes and from abrupt changes in driveline torque due to rapid engine acceleration and deceleration.

Torsional vibrations cause premature wear to driveline components as well as audible noise. In a conventional driveline, the flywheel, which is rigidly connected to the crankshaft, will generate high reaction forces on the crankshaft. Torque irregularities from a periodic combustion also engine adds additional stress in the form of high frequency torques to the transmission. Furthermore, when a manual transmission is in neutral, gear rattle occurs, which is also an audible event, due to the teeth of meshing gears lifting away from another and then striking each other as a result of high frequency torque fluctuations.

Along with gear rattle, order based responses from the second or third engine order may be passed through the drivetrain and into the body structure. This sound can be greatly amplified if the components forming the sound are excited at their resonant frequencies.

Torsional vibration issues are further compounded by efforts to improve vehicle efficiency. Reductions in vehicle size and weight as well as reductions in driveline component inertia, such as flywheel masses, as well as reductions in transmission oil viscosity have added to the existing torsional vibration challenges. Lower drivetrain inertia results in a higher natural frequency of the drivetrain. As the engine rotational speed passes through the drivetrain natural frequency, resonant frequency occurs. The input displacement of a system is amplified at resonant frequency.

It is well known in the art to incorporate torsional vibration damping mechanisms in a dry clutch. As rotation occurs, the energy storage means within the damper, typically coil springs, provide the rotational compliance between the rotating elements. Another component of the damper is hysteresis, which is provided by friction producing elements. The hysteresis cooperates with the energy storage component of the damper to remove energy from the system.

The prior art is replete with friction clutches with dampers for attenuating torsional vibrations. A variety of spring arrangements have been employed to provide frictional force for damping. Most frictional dampers employ a diagram spring in some form to provide force along the axis of rotation of the clutch disk. In order to reduce weight for fuel economy and size for packaging purposes drivetrain components are being optimized. One way to meet size and weight requirements is to provide multipurpose parts in component assemblies. Many clutches employ a damper having a separate frictional spring element to provide force along the axis of rotation of the clutch disk to increase the hysteresis. A lighter and more compact clutch damper may be available by eliminating the need for a separate frictional spring element.

Therefore, there is a need in the art to provide an improved damper for a friction clutch which is lighter and more compact than a conventional friction clutch damper.

SUMMARY OF THE INVENTION

A friction clutch comprises a driving member having an axis of rotation, a cover coupled to the driving member for rotation therewith, a pressure plate coupled to the cover for rotation therewith and a driven disk coupled to an axially extending driven shaft for rotation therewith. The driven disk is interposed between the driving member and the pressure plate, the driven disk includes a rotatable disk assembly. The rotatable disk assembly includes a disk plate which rotates about an axis of rotation. The disk plate has a plurality of apertures and a plurality of friction pads attached thereto. A hub assembly which includes a hub secured to at least one spring cover plate having a plurality of apertures rotates relative to the disk assembly. The apertures in the disk assembly and the hub assembly are at least partially aligned. Energy storage means are disposed within the apertures in the disk assembly and hub assembly for absorbing torque as a function of relative rotation between the hub assembly and disk assembly. At least one reinforcing plate is disposed between the disk assembly and the hub assembly. The reinforcing plate has a plurality of undulations providing a load between the disk assembly and hub assembly.

In an alternate embodiment, the reinforcing plate may be coupled to the hub assembly or the disk assembly. Furthermore, the undulations in the reinforcing plate may be continuous. Also, the undulations may be disposed about an outer circumference of the reinforcing plate. The reinforcing plate may have a plurality of apertures disposed therein which are at least partially aligned with the apertures disposed in the disk assembly and the hub assembly.

The friction torque device may include a first reinforcing plate and a second reinforcing plate coupled to the hub assembly, where the disk plate of the disk assembly is disposed between the first and second reinforcing plates, each of the first and second reinforcing plates have a plurality of apertures that are at least partially aligned with the apertures disposed within the disk assembly and the hub assembly.

The driven disk of the friction torque device may further include a first spring cover plate and second spring cover plate coupled to the hub assembly where each of the first spring cover plate and second spring cover plate have a plurality of apertures that are at least partially aligned with the apertures disposed with one or more reinforcing plates and the disk plate.

Further objects, features and advantages of the present invention will become apparent to those skilled in the art from analysis of the following written description, the accompanying drawings and appended claims.

BRIEF DESCRIPTION OF THE DRAWINGS

FIG. 2 is a front view of a driven disk embodying the principals of the present invention.

FIG. 3 is a cross-sectional view of the driven disk of FIG. 2 along section A—A, revealing the operative elements of the present invention.

FIG. 4 is a front view of a reinforcing plate according to the principals of the present invention, revealing undulations incorporated therein.

FIG. 5 is a partial sectional view taking along section B—B of FIG. 4, revealing the profile of an undulation.

DETAILED DESCRIPTION OF THE PREFERRED EMBODIMENT

Figure 1:
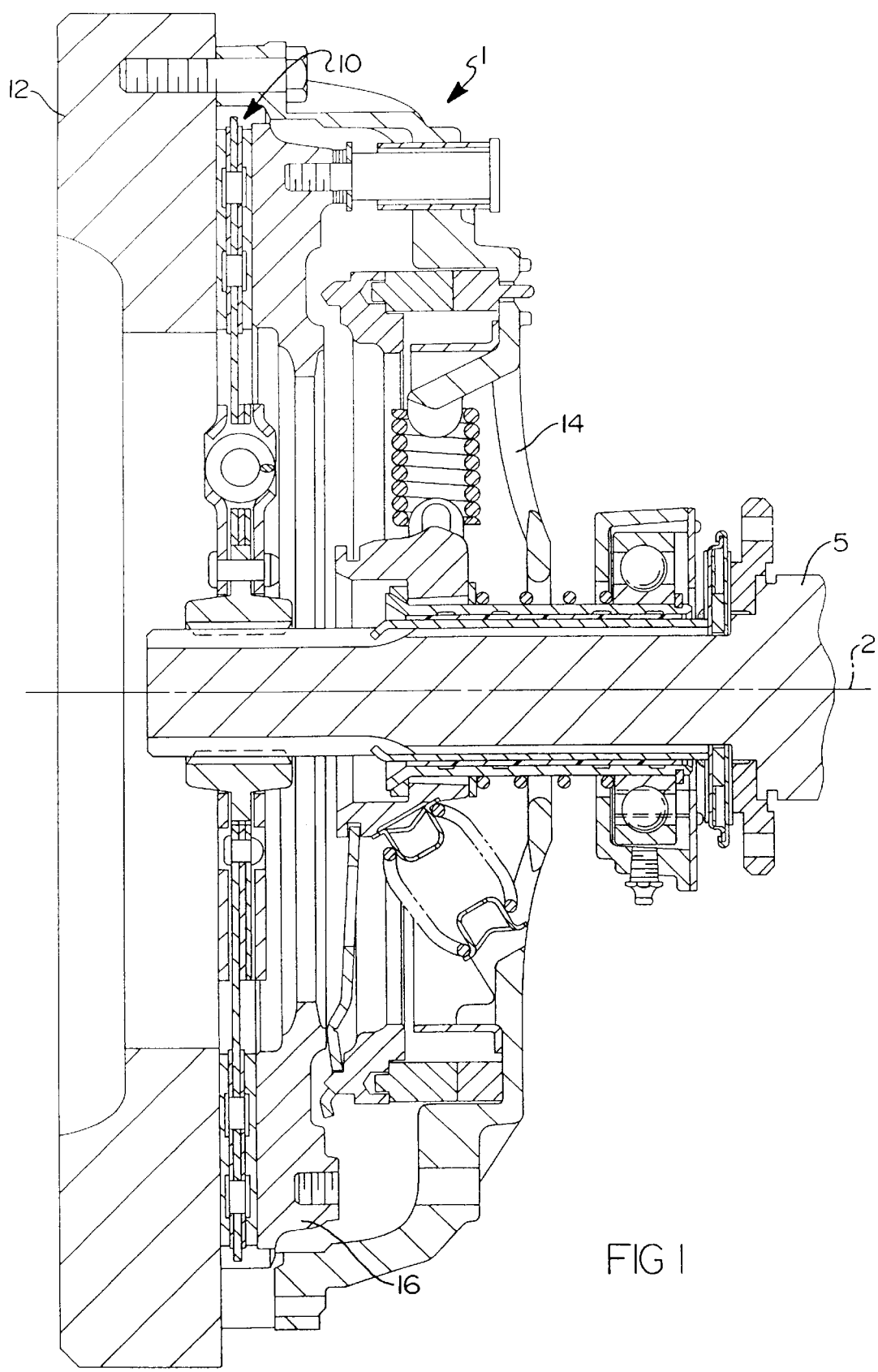
FIG. 1 is a cross-sectional view of a friction torque device incorporating the improved damper of the present invention.

Referring now to FIG. 1, a cross-sectional view of a friction torque device 1 of the present invention is shown. The friction torque device 1 comprises a driving member 12 having an axis of rotation 2. A cover 14 is coupled to the driving member 12 for rotation therewith. A pressure plate 16 is coupled to the cover 14 for rotation therewith. A driven disk 10 is coupled to an axially extending driven shaft 5 for rotation therewith. Although driven disk 10 is shown splined to driven shaft 5, it should become apparent to those skilled in the art that any suitable means known in the art may be substituted for a splined coupling. The driven disk 10 is interposed between the driving member 12 and the pressure plate 16.

Referring now to FIGS. 2 and 3, the driven disk 10 of the present invention is shown. Driven disk 10 comprises a rotatable disk assembly 20 which includes a disk plate 40 having a plurality of apertures 22. A plurality of friction pads 50 are attached to disk plate 40 for frictional engagement with pressure plate 16 and driving member 12. A hub assembly 30 includes a hub 70 secured to at least one spring cover plate 100. Spring cover plate 100 has a plurality of apertures 32 disposed therein. The apertures 22, 32 are at least partially aligned. Energy storage means 80 are disposed within the apertures 22, 32 within disk plate 40 and spring cover plate 100. Disk assembly 20 is rotatable relative to hub assembly 30. The energy storage means 80 absorb torque as a function of relative rotation between the hub 70, via spring cover plate 100 and disk plate 40.

At least one reinforcing plate 60, as shown in FIG. 4, is disposed between disk plate 40 and spring cover plate 100. As can be seen in FIG. 4, reinforcing plate 60 has a plurality of undulations 64 for providing a spring load between disk plate 40 and spring cover plate 100 along the axis of rotation 2. Although the undulations 64 are shown disposed about an outer circumference of reinforcing plate 60, the undulations 64 may be disposed anywhere upon the reinforcing plate 60. Furthermore, the undulations 64 may be segmented or a continuous wave.

In the exemplary embodiment shown in FIGS. 2 and 3, driven disk 10 comprises a rotatable disk assembly 20 having disk plate 40 fixedly attached to a first reinforcing plate 60 and a second reinforcing plate 65 by a plurality of rivets 21. First and second reinforcing plates 60, 65 each have a plurality of apertures 62 and 67, respectively, at least partially aligned with apertures 22 in disk plate 40. Hub assembly 30 includes first spring cover plate 100 and second spring cover plate 105 fixedly attached to hub 70 by a plurality of rivets 31.

In exemplary embodiment of FIG. 3, driven disk 10 further includes a first lateral plate 90 and a second lateral plate 95 disposed between first spring cover plate 100 and second spring cover plate 105. First lateral plate 90 and second lateral plate 95 are also fixedly attached to hub 70 by rivets 31. First lateral plate 90 and second lateral plate 95 each include a plurality of apertures 92, 97, respectively, which are at least partially aligned with apertures 32 disposed in first spring cover plate 100 and second spring cover plate 105.

Energy storage means 80 are disposed within apertures 22, 32, 62, 67, 92, 97 for absorbing torque as a function of relative rotation between hub assembly 30 and disk assembly 20. Although a plurality of reinforcing plates 60, 65, 90, 95 are shown, as few as one reinforcing plate 60 may be employed within the spirit and scope of the present invention.

Referring now to FIG. 2, a section of spring cover plate 100 has been removed to reveal energy storage means 80 as a plurality of coil springs, specifically a plurality of outer coil springs 110 and inner coil springs 115 in the exemplary embodiment. Outer coil springs 110 are operatively disposed between the disk assembly 20 and the hub assembly 30, more specifically, outer coil springs 110 contact disk plate 40, first reinforcing plate 60 and second reinforcing plate 65 at a first end and first spring cover plate 100 and second spring cover plate 105 at a second end. Inner coil springs 115 contact first and second lateral plates 90, 95 at a first end and disk plate 40 and reinforcing plates 60 and 65 at a second end. As the disk assembly 20 rotates relative to hub assembly 30, torque is absorbed as a function of relative rotation between disk assembly 20 and hub assembly 30.

In the preferred embodiment undulations 64 are disposed in a lateral reinforcing plate 90, which is coupled to hub assembly 30. As stated above, as few as one reinforcing plate 60 may be employed to achieve the desired results of reinforcing plates 60, 65 or lateral reinforcing plates 90, 95. Furthermore, the undulations 64 may be disposed in any suitable location upon one or more reinforcing plates 60, 65, 90, 95.

The driven disk 10 of the present invention damps torsional vibrations in a driveline as a result of the relative rotation between disk assembly 20 and hub assembly 30. More specifically, as a torsional vibration is introduced to driven disk 10, hub assembly 30 rotates with respect to disk assembly 20 whereby torque spikes are dissipated in the form of heat resulting from friction as the energy storage means 80 are compressed and then expand back to their initial state.

Torsional damping is achieved within the present invention by providing an energy storage component and a hysteresis component. The energy storage component has been previously described as energy storage means 80, or in the exemplary embodiment as outer spring 110 and inner spring 115. The hysteresis, or frictional component, is provided by the surface-to-surface coefficient of friction between the disk assembly 20 and the hub assembly 30. As the load along the axis of rotation 2 increases between the hub assembly 30 and the disk assembly 20, the resulting friction force is increased. In the prior art, this increase was provided by an additional spring member disposed between disk plate 40 and one or both spring cover plates 100, 105. By providing an existing reinforcing plate with a plurality of undulations 64, the desired axial load may be achieved while reducing the weight, cost, complexity and size of driven disk 10, which also results in a more compact friction torque device 1.

The foregoing discussion discloses and describes the preferred embodiment of the present invention. However, one skilled in the art will readily recognize from such discussion and the accompanying drawings and claims that various changes, modifications and variations can be made therein without departing from the true spirit and fair scope of the invention as defined in the following claims.

What is claimed is:

1. A driven disk for a friction torque device, comprising:

a rotatable disk assembly including a disk plate having a plurality of apertures, said disk assembly having an axis of rotation, said disk assembly having a plurality of friction pads attached thereto;

a hub assembly including a hub secured to at least one spring cover plate having a plurality of apertures, said hub assembly rotatable relative to said disk assembly;

energy storage means disposed within said apertures in said disk assembly and said hub assembly, said apertures being at least partially aligned, said energy storage means for absorbing torque as a function of relative rotation between said hub assembly and disk assembly; and at least one reinforcing plate disposed between said disk assembly and said hub assembly, said reinforcing plate having a plurality of undulations, said undulations providing a load between said disk assembly and said hub assembly and said reinforcing plate having a plurality of apertures formed therein, said apertures within said reinforcing plate being at least partially aligned with said apertures disposed within said disk assembly and said hub assembly.

2. A driven disk for a friction torque device, comprising:

a rotatable disk plate having a plurality of apertures, said disk plate having a plurality of friction pads attached thereto;

a pair of spring cover plates coupled to a hub for rotational movement therewith, said spring cover plates having a plurality of apertures;

energy storage means disposed within said apertures in said disk plate and said spring cover plates, said apertures being at least partially aligned, said energy storage means for absorbing torque as a function of relative rotation between said disk plate and said hub; and at least one reinforcing plate coupled to at least one of said spring cover plates and disposed between said disk plate and one of said spring cover plates, said reinforcing plate having a plurality of undulations, said undulations providing a load between said disk plate and one of said spring cover plates, said reinforcing plate having a plurality of apertures disposed therein, said apertures within said reinforcing plate being at least partially aligned with said apertures disposed within said disk plate and said spring cover plates, whereby said energy storage means disposed in said apertures absorb torque as a function of relative rotation between said disk plate and said hub.

3. A friction torque device, comprising:

a driving member having an axis of rotation;

a cover coupled to said driving member for rotation therewith;

a pressure plate coupled to said cover for rotation therewith; and a driven disk coupled to an axially extending driven shaft for rotation therewith, said driven disk interposed between said driving member and said pressure plate, said driven disk including a rotatable disk assembly, said rotatable disk assembly including a disk plate having a plurality of apertures, said disk assembly having an axis of rotation, said disk assembly having a plurality of friction pads attached thereto, a hub assembly including a hub secured to at least one spring cover plate having a plurality of apertures, said hub assembly rotatable relative to said disk assembly, energy storage means disposed within said apertures in said disk assembly and said hub assembly, said apertures being at least partially aligned, said energy storage means for absorbing torque as a function of relative rotation between said hub assembly and disk assembly, and at least one reinforcing plate disposed between said disk assembly and said hub assembly, said reinforcing plate having a plurality of undulations, said undulations providing a load between said disk assembly and said hub assembly, said reinforcing plates having a plurality of apertures disposed therein, said apertures within said reinforcing plate being at least partially aligned with said apertures disposed within said disk assembly and said hub assembly.

* * * * *